A. L. BENNETT.
CUSHION WHEEL.
APPLICATION FILED JAN. 27, 1919.
1,304,011.
Patented May 20, 1919.
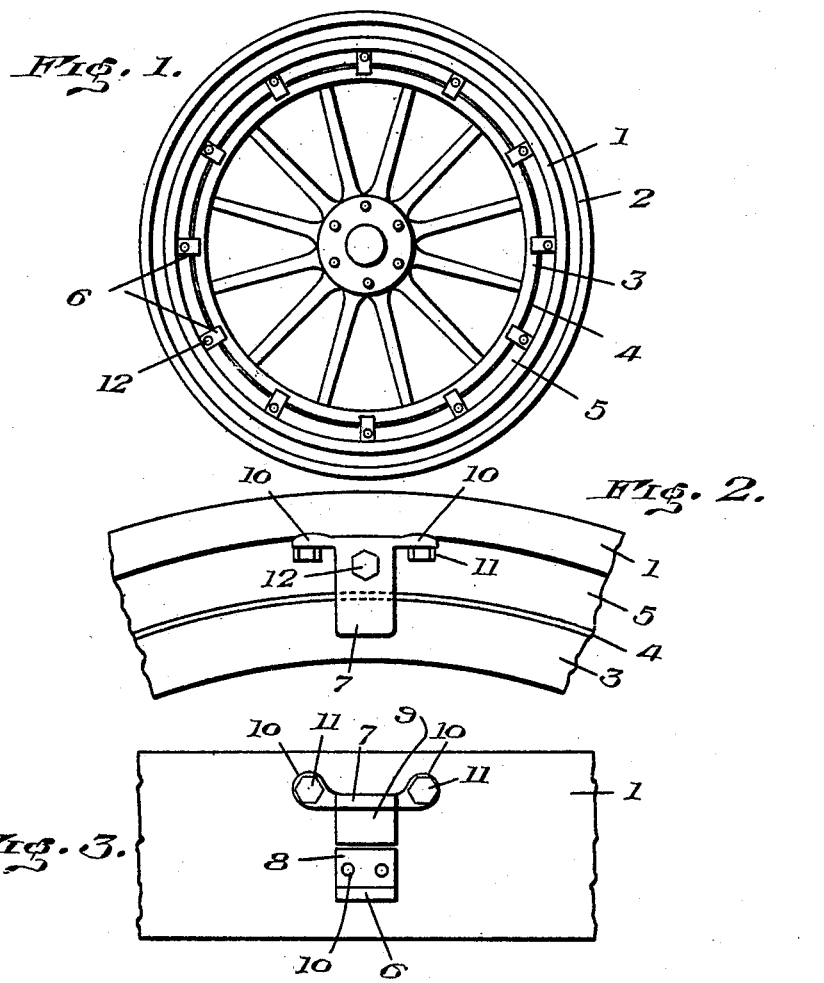
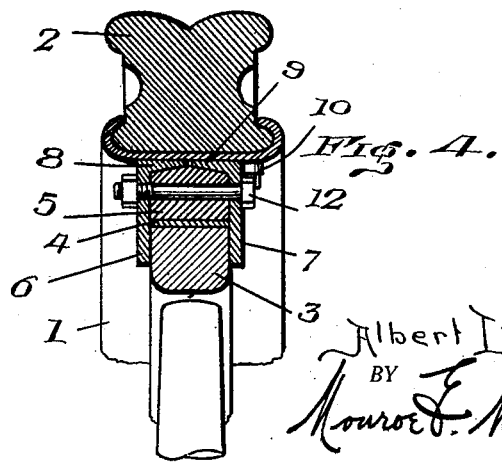
WITNESS:
INVENTOR.
Albert L. Bennett
BY
ATTORNEY.

UNITED STATES PATENT OFFICE.

ALBERT L. BENNETT, OF KANSAS CITY, MISSOURI.

CUSHION-WHEEL.

1,304,011.  Specification of Letters Patent.  Patented May 20, 1919.

Application filed January 27, 1919. Serial No. 273,303.

*To all whom it may concern:*

Be it known that I, ALBERT L. BENNETT, a citizen of the United States, and resident of Kansas City, in the county of Jackson and State of Missouri, have invented certain new and useful Improvements in Cushion-Wheels, of which the following is a specification.

The present invention relates to resilient or cushioned wheels, and is particularly an improvement over the cushioned wheel disclosed in my Patent No. 1,261,896, granted April 9, 1918.

It is the object of the invention to provide a resilient or cushioned wheel having cushioning means between the rim and felly, and novel and improved means for guiding the rim and felly for relative movements in the plane of the wheel to afford the resilient action without the liability of the parts becoming displaced laterally.

Another object of the invention is the provision of such a wheel wherein the construction is such that the rim can be removed from the felly, for the purpose of repair or replacement of the tire, cushion or other part.

A further object is the provision of novel means for attaching the guide bars to the rim to be slipped off of the felly, the structure being substantial when assembled to withstand the strains to which the parts are subjected in use.

With the foregoing and other objects in view which will be apparent as the description proceeds, the invention resides in the construction and arrangement of parts as hereinafter described and claimed, it being understood that changes can be made without departing from the spirit of the invention.

The invention is illustrated in the accompanying drawing, wherein:—

Figure 1 is a side elevation of an automobile wheel embodying the present improvements, looking from the outside.

Fig. 2 is an enlarged fragmentary elevation of the rim, felly, cushion and one of the inner side bars.

Fig. 3 is a plan view of a pair of the guides, looking radially outward toward the inner periphery of the rim, the felly and cushion being removed.

Fig. 4 is a cross section through the felly, cushion, rim, tire and a pair of the guide bars.

The present wheel, like that disclosed in said patent, embodies a suitable rim 1 for holding a solid rubber tire 2 or its equivalent, a wooden felly 3, a steel band 4 embracing the felly, and an annular cushion 5 of suitable rubber or equivalent material disclosed between the band 4 and rim 1, to constitute the cushioning means, which with the tire 2, provide for easy riding.

In order to guide the rim and felly for relative movements in the plane of the wheel, a plurality of pairs of radial guide bars 6 and 7 are provided, and any suitable number of them can be used. As shown, a pair of guide bars is used between each pair of spokes, as seen in Fig. 1, and the bars 6 are located at the outer side of the wheel, while the bars 7 are located at the inner side. Said bars are secured to the rim and project inwardly across the opposite sides of the cushion 5 so as to overlap the opposite sides of the felly, 3, thereby guiding the felly and rim for movement in the plane of the wheel, and preventing relative transverse displacement of the parts.

As effective means for attaching the guide bars to the rim, the outer ends of said bars are provided with angularly extending feet or portions 8 and 9, respectively, which project toward one another and which bear outwardly against the inner periphery of the rim, the cushion 5 being cut away where it extends across said portions 8 and 9. The portions 8 of the outer bars 7 are riveted, as at 10, or otherwise permanently secured to the rim 1, while the inner bars 7 are detachably secured to the rim, thereby permitting removal of the rim for purpose of replacement. For this purpose, the outer end of each bar 7 is provided with ears 10 projecting from its opposite edges in the plane of the portion 9, said ears extending away from the portion 9 and being apertured for the reception of screws 11 or other securing means extending outwardly through the ears 10 and taking into the rim 1 for clamping said ears and portion 9 of the bar 7 to the rim firmly. The ears 10 and screws 11 will be spaced inwardly from the cushion 5 so that said screws are accessible from the inner side of the wheel, for inserting and removing them. A tie bolt 12 extends transversely through each pair of bars 6 and 7 and through the cushion 5, as seen in Fig. 4, and when the nut thereof is tightened sufficiently, said bolt or stay will hold the bars 6 and 7 snugly against the felly, thus preventing said bars from spreading or separating. Furthermore, said bolt or stay will hold the portions 9 against the rim, and it will be noted that these portions 8 and 9 of the guide bars will serve as braces to prevent the transverse displacement of said bars, thus providing a substantial construction, and reducing to a minimum any liability of the bars bending sidewise under the strains.

The present wheel has a cushioning action between the felly and rim, which assisted by the tire 8, will provide for easy running. The present construction eliminates the cushions bearing against the inner periphery of the felly, so that the guide bars can be shorter than those shown in said patent. With the construction shown in said patent, it is difficult or impossible to remove the rim, whereas with the present construction, the rim can be easily removed, by removing the nuts from bolts 12 and removing the screws 11, thus detaching the inner guide bars 7. The rim can then be pulled off of the felly, thereby permitting the tire, cushion or other parts to be removed, repaired or replaced. To assemble the parts, the cushion and rim are slipped over the felly, the outer bars 6 contacting with the felly to limit the movement of the rim over the felly, and the inner bars 7 are then secured in place as before.

The removability of the bars 7 not only permits the rim to be removed for purpose of repair and replacement, but also enables the rims of the front and rear wheels of the vehicle to be interchanged, thus distributing the wear on the tires and obtaining greater mileage.

Having thus described the invention, what is claimed as new is:—

1. A wheel comprising a rim, a felly, a cushion of rubber or similar material fitting between them, guide bars at opposite sides of the cushion overlapping the felly and having their outer ends abutting the rim, the outer ends of said bars having portions extending angularly toward one another between said cushion and rim and fitting the rim, said portions of the bars at one side being secured rigidly to the rim, said portions of the bars at the other side being removable from the rim and cushion, and means removably securing the outer ends of the last named bars to the rim at one side of said cushion.

2. A wheel comprising a rim, a felly, a cushion of rubber or similar material fitting between them, guide bars at opposite sides of the cushion overlapping the felly and having their outer ends abutting the rim, the outer ends of the said bars having portions extending angularly toward one another between said cushion and rim and fitting the rim, said portions of the bars at one side being secured rigidly to the rim, said portions of the bars at the other side being removable from the rim and cushion, the outer ends of the last named bars having ears extending away from the cushion and fitting the rim, and means for detachably securing said ears to the rim.

3. A wheel comprising a felly, a rim surrounding it, a cushion of rubber or similar material fitted between said rim and felly, guide bars at opposite sides of said cushion overlapping the opposite sides of the felly, the outer ends of the bars at one side being secured rigidly to the rim, the outer ends of the bars at the opposite side having portions abutting the rim and extending angularly to fit between the rim and cushion and brace said bars, the outer ends of the last named bar having ears fitting the rim extending away from the cushion, and means for detachably securing the ears to the rim at one side of the cushion.

In testimony whereof I hereunto set my hand.

ALBERT L. BENNETT.